C. ROBERTS.
VEHICLE SEAT.
APPLICATION FILED JULY 30, 1913.
1,175,179.
Patented Mar. 14, 1916.
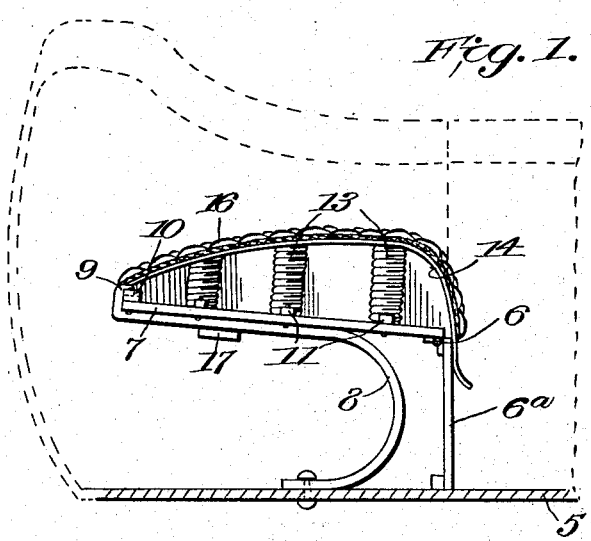
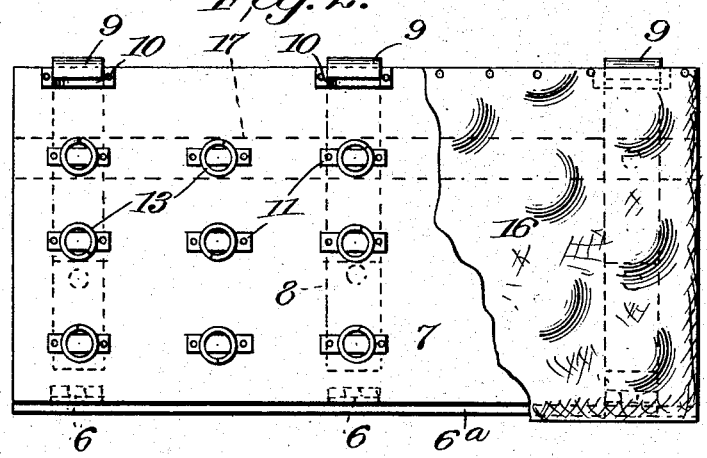
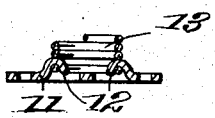
Witnesses
F. D. O'Connell
B. F. Garvey Jr.
Inventor
Charles Roberts,
By Richart Owen,
his Attorney
THE COLUMBIA PLANOGRAPH CO., WASHINGTON, D.

UNITED STATES PATENT OFFICE.

CHARLES ROBERTS, OF DETROIT, MICHIGAN.

VEHICLE-SEAT.

1,175,179.  Specification of Letters Patent.  Patented Mar. 14, 1916.

Application filed July 30, 1913. Serial No. 782,047.

*To all whom it may concern:*

Be it known that I, CHARLES ROBERTS, a citizen of the United States, residing at Detroit, in the county of Wayne and State of Michigan, have invented certain new and useful Improvements in Vehicle-Seats, of which the following is a specification.

This invention relates to vehicle seats and has for its primary object to provide a seat capable of absorbing all shock due to road inequalities or the like.

Another object of the invention is to provide a simple and efficient construction which may be readily mounted in a vehicle body, and is so constructed as to not only absorb the shock but will likewise be durable and inexpensive to manufacture.

Other objects as well as the nature, characteristic features and scope of my invention will be more readily understood from the following description taken in connection with the accompanying drawings and pointed out in the claims forming a part of this specification.

Referring to the drawings:—Figure 1 is a sectional view of my improved seat illustrating the application thereof; Fig. 2 is a plan fragmentary view disclosing the seat springs; Fig. 3 is a detail sectional view of one of the springs and spring retaining plates; and Fig. 4 is a detail enlarged view of the seat raising handle.

In the drawings wherein is illustrated the preferred form of this invention, a base 5 of a vehicle body is provided in order to properly illustrate the application of my invention. Mounted on the base 5 is a frame 6 which may be of wood, metal or any other suitable material, and has a portion 6ª thereof extending upwardly at right angles to the floor or base 5 of the vehicle, and the opposite portion 7 thereof hingedly mounted on said portion 6ª, the hinged portion being normally in right angled relation to the portion 6ª. Rigidly mounted on the base or floor 5 of the vehicle, are a plurality of flat springs 8, which are curved arcuately from the base 5 and into engagement with the lower face of said frame portion 7, the extreme upper ends thereof being secured to the upper rear face of said portion as indicated at 9 and shown to advantage in Fig. 2. The upper face of the portion 7 being provided with metallic depressed plates 10 in which said ends 9 are carried.

A plurality of plates 11 are rigidly mounted through the medium of rivets or the like on the upper face of said portion 7, each one thereof being provided with a pair of fingers 12, which engage with the coil springs 13. On application to Fig. 2 of the drawings, it will be seen that the plates 11 are arranged in spaced relation on the upper face of the portion 7, each one of said plates having mounted thereon a coil spring which is securely held thereon through the medium of the fingers 12, in view of the fact that the fingers engage over the lowermost convolution of each of said springs.

An arcuate metallic plate 14 is carried on the upper end of said springs, and is hingedly mounted at the rear end thereof to the portion 7 of the frame, the forward end thereof being provided with a depending finger 15 so as to provide a handle for facilitating the raising and lowering of said plate. A cushion 16 is disposed over the plate 14, and is of the ordinary or any desired form. In order to insure a positive retaining action between the flat springs 8 and the portion 7 of the frame 6, a steel beam 17 is arranged across the springs and secured to said portion 7 in any suitable manner.

The seat is mounted in a vehicle body, in the manner above described, having the flat or main springs 8 thereof arranged beneath the seat so as to provide a means for absorbing the shock common to road vehicles, immaterial of obstructions or road inequalities of any type and at the same time are so arranged in a body as to withstand strain exerted thereon by the pressure of the occupants of the vehicle. To further insure a positive shock absorbing means, the coil springs 13 are provided, having the pressure equally distributed to each one thereof through the provision of the plate 14, so as to eliminate the springs coming through the cushion after a certain length of time. To those skilled in the art it is obvious to place side curtains or the like beneath the rear or front seat of the vehicle, and it is with this in view that the plate 14 has been hingedly mounted so as to allow for the placing of the curtains or the like in the seat, and at the same time allowing for the free removal of the same when it is so desired, and obviating the necessity of removing the seat.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent is:—

1. In a vehicle seat, the combination with a floor, of a support having a hinged section, flat springs connected to the floor and engaging the hinged section, the free ends of said springs being bent upwardly and backwardly to engage the free edge of the hinged section, bars securing the springs and hinged section together, a plate hingedly connected to the first mentioned hinged section, coil springs mounted between the plate and hinged section, means for securing the coil springs to the hinged section, and a cushion secured to said plate.

2. In a vehicle seat, the combination with a floor, of a support having a hinged section, said section being provided with depressed plates, flat springs connected to the floor and engaging the hinged section and having their terminals secured by the depressed plates, bars securing the springs and hinged section, a plate hingedly connected to the first mentioned hinged section, springs mounted between the plate and hinged sections, and means for securing the second said springs to the hinged section.

3. In a vehicle seat, the combination with a floor, of a support having a hinged section, flat springs secured to the floor and curved into parallel engagement with the said section and having their free ends secured to the upper side of said section by depressed plates, bars securing the springs and hinged section together, an arcuate plate hingedly connected to the first mentioned hinged section, coil springs mounted between the plate and hinged section, means securing the said springs to the hinged section, and a cushion secured to the arcuate plate.

In testimony whereof I affix my signature in presence of two witnesses.

CHARLES ROBERTS.

Witnesses:
F. WM. PIPER,
EDWARD J. BOH.

Copies of this patent may be obtained for five cents each, by addressing the "Commissioner of Patents, Washington, D. C."